May 7, 1968     W. BREUER ET AL     3,382,346
THERMOSTATICALLY CONTROLLED CONSTANT TEMPERATURE BATH
Filed Sept. 27, 1965
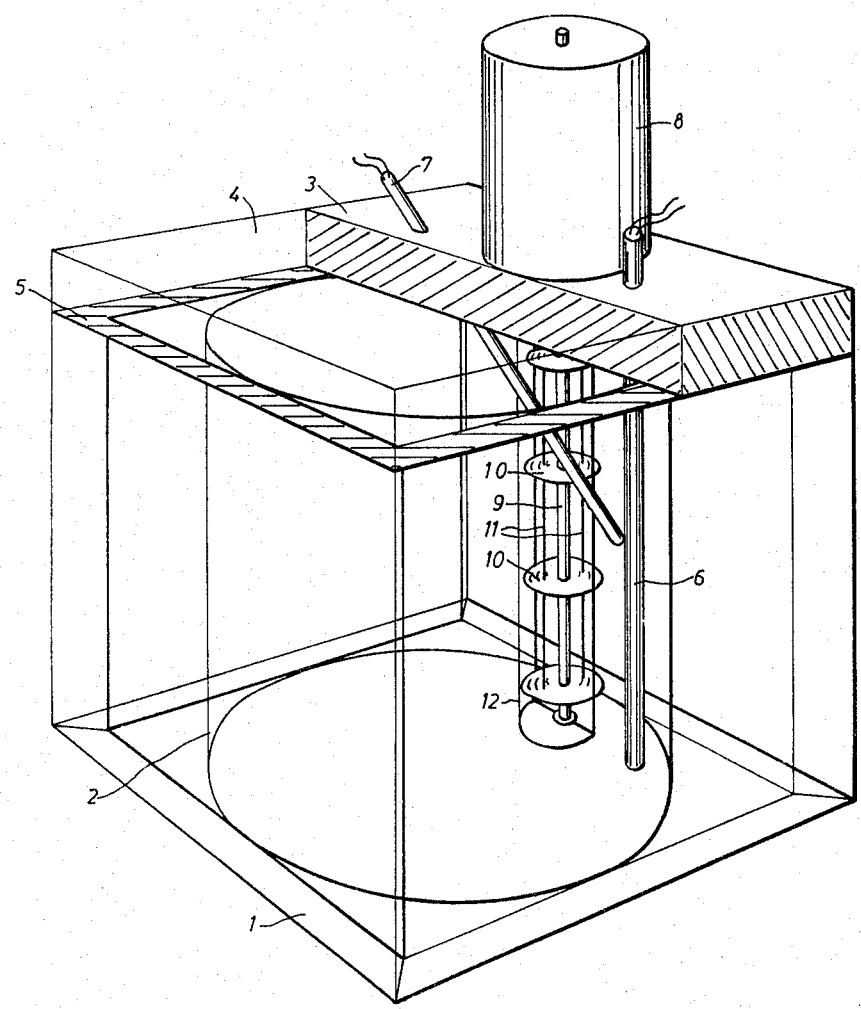
INVENTORS:
WOLFRAM BREUER, KLAUS SIEMER.

United States Patent Office 3,382,346
Patented May 7, 1968

3,382,346
THERMOSTATICALLY CONTROLLED CONSTANT TEMPERATURE BATH
Wolfram Breuer and Klaus Siemer, Leverkusen, Germany, assignors to Farbenfabriken Bayer Aktiengesellshaft, Leverkusen, Germany, a corporation of Germany
Filed Sept. 27, 1965, Ser. No. 490,424
Claims priority, application Germany, Oct. 9, 1964,
F 44,178
1 Claim. (Cl. 219—331)

ABSTRACT OF THE DISCLOSURE

Liquid thermostat comprising a container having a two-part cover; a stirrer within the container having vertically disposed stirring discs with taut wires extending therebetween depending from a first part of the cover; a heating means depending from said first part of the cover; a temperature probe depending from said first part of the cover; a cylindrical screen within the container surrounding the stirrer, temperature probe and heating means; and a shield adjacent said stirrer between such and the remainder of the area in said container.

This invention relates to liquid thermostats. It more particularly refers to liquid thermostats which are peculiarly adapted to provide a constant temperature liquid bath for the measurement of physical parameters having small values, particularly concerning trace elements.

It is known to provide constant temperature baths for housing various materials and measuring devices. Particular problems are encountered when attempting to provide constant temperature baths for measuring the physical parameters of trace elements since, owing to the extremely small concentrations of components to be measured, temperature fluctuations have a significant effect upon the readings, which can frequently be sufficient to mask or even falsify the measurement taken.

Thermostats designed to be installed in analytical instruments not only have to have extreme constancy of temperature and be small, light and easy to handle, but must also be simple in their mechanical construction and in their electrical connections and easy to service. Further they must be so sturdy and reliable in operation that they can withstand inclinations, vibrations and accelerations when installed in vehicles without any impairment in the temperature constancy.

The thermostat according to this invention is composed of a thick-walled plastic container filled to the brim with a suitable liquid and having a tightly closing lid composed of two parts, one of which is adapted to have the elements that are to be kept at a constant temperature depending therefrom, and the other of which is adapted to have a temperature probe, a stirring element and motor and heating means depending therefrom. The container has a hollow cylindrical screen therein which surrounds all the above-identified elements. There is further provided a shield of substantially semicircular construction around the stirring element interposed between such element and the remainder of the inside of the container. The stirring element is suitably composed of a shaft having vertically disposed stirring discs thereon, which stirring discs are joined by two taut wires near the periphery thereof. According to the invention the heating rod and stirrer element of a liquid thermostat are arranged to extend over the whole height of the bath, are close together and are directly adjacent to the wall of the screen. Further, the stirrer element, which consists of a motor driven shaft extending over the whole height of the bath and having horizontal, circular stabilizing discs arranged at equal intervals apart between which wires are stretched vertically, is shielded from the center of the bath containing the measuring unit by a semi-circular shield the internal diameter of which is only slightly greater than the diameter of the stabilizing discs 10.

Understanding of this invention will be facilitated by reference to the drawing which is an embodiment of the invention shown diagrammatically.

Referring now to this drawing, a thermostat is shown comprising a container 1, of square cross-section, which is selected to be filled to the brim with a liquid and contains a cylindrical screen 2 which lies against the inner walls of the container and extends over the whole height of the bath. This container is closed by a lid consisting of two parts 3 and 4 and by a seal 5 interposed between the lid and the container. To enable the temperature sensitive parts of the measuring unit (not shown), which are attached to the part 4 of the lid and immersed in the bath, to be observed, the container 1, screen 2 and part 4 of the lid are made of transparent material. The part 3 of the lid carries a heating rod 6, which extends over the whole height of the bath, a temperature probe 7 in contact with the rod 6, and a driving motor 8 including the stirrer assembly 9 to 12. This assembly consists of a motor driven shaft 9 which extends over the whole height of the bath and carries circular stabilizing discs 10 arranged horizontally at equal distances apart with vertical wires 11 stretched between them, and of a semi-circular shield 12 which shields the shaft 9 from the centre of the bath. The inner radius of the shield 12 is slightly greater than the radius of the stabilizing discs 10. The heating tube 6 and stirrer assembly 9 to 12 are arranged close together directly adjacent to the inner surface of the screen 2.

By this special construction and arrangement of heating element and stirrer, a closed, temperature controlled current of liquid rotating at high speed along the inner wall of the screen 2 is produced over the whole height of the bath round the useful space surrounding the measuring unit at the centre of the bath. This temperature controlled current sets the liquid in the useful space into slow rotation by friction, supplies the necessary energy in this space, preferably by diffusion, whereby fluctuations in the heat supply from the heating element are equalized so that they do not affect the useful space, and it shields this space against fluctuations in the temperature of the surroundings.

This principle of an orderly stream of liquid in the thermostat as described herein renders the useful space in the center of the bath a zone of greatest temperature constancy.

Fluctuations in the controlled heat supply and influences from the external temperature affect only the marginal zone along the screen.

Thermostats constructed in accordance with this invention have been successfully tested over many years in instruments for measuring trace quantities of gas under conditions where controlling the external atmosphere is difficult.

We claim:
1. Liquid thermostat consisting of a thick-walled plastic container filled to the brim and having a tightly closing lid composed of two parts, one of which serves for the attachment of the elements that are to be kept at a constant temperature by the thermostat, while the other part carries the heating means, temperature probe, stirrer and motor; a hollow cylindrical screen arranged in the con- tainer and extending over the whole height of the container, said heating rod and stirrer element being arranged close together inside and in the direct vicinity of the screen and extend over the whole height of the bath; and the stirrer element, which consists of a motor driven shaft, extending over the whole height of the bath and having horizontal, circular stabilizing discs arranged at equal intervals apart with wires stretched vertically between them; being shielded from the center of the bath containing the elements that are to be kept at constant temperature by a shield of semi-circular cross-section the inner diameter of which is only slightly greater than the diameter of the stabilizing discs.

References Cited

UNITED STATES PATENTS

| | | | |
|---|---|---|---|
| 2,227,938 | 1/1941 | Krebs | 219—321 X |
| 2,418,254 | 4/1947 | Fleharty | 219—331 X |
| 2,993,108 | 7/1961 | Haake | 219—314 X |
| 3,147,364 | 9/1964 | Ross et al. | 219—331 |

ANTHONY BARTIS, *Primary Examiner.*